US000001802H

United States Statutory Invention Registration [19]

[11] Reg. Number: H1,802

Erwin et al.

[45] Published: Sep. 7, 1999

[54] SYSTEM AND METHOD FOR AUTOMATICALLY PROVISIONING A TELECOMMUNICATIONS SWITCH

[75] Inventors: Jenny W. Erwin; Yoogin Lean, both of Collierville; Dexiang J. Xu, Cordova, all of Tenn.

[73] Assignee: DSC/Celcore, Inc., Plano, Tex.

[21] Appl. No.: 09/026,479

[22] Filed: Feb. 19, 1998

Related U.S. Application Data

[60] Provisional application No. 60/060,107, Sep. 26, 1997.

[51] Int. Cl.[6] ..... H04M 3/00

[52] U.S. Cl. ..... 379/243

[56] References Cited

U.S. PATENT DOCUMENTS

| | | | |
|---|---|---|---|
| 5,487,101 | 1/1996 | Fletcher | 379/60 |
| 5,521,961 | 5/1996 | Fletcher et al. | 379/59 |
| 5,623,532 | 4/1997 | Houde et al. | 379/58 |
| 5,627,881 | 5/1997 | Fletcher | 379/60 |

OTHER PUBLICATIONS

Steve Chen, "*Hybrid MicroSystems: The Ultimate Flexibility in Cellular Applications*", 1996, pp. 1–16, Celcore, Inc., Memphis, Tennessee.

"*GlobalHub Mobility Manager –Enables "One Number" PCS Service Via Motorola PPS Residential Products*" pp. 1–2, Celcore, Inc., Memphis, Tennessee, 1996.

"*IS –41 Network Hub –The Mobility Manager for Celcore's GlobalSystem*" pp. 1–2, Celcore, Inc., Memphis, Tennessee, 1996.

"*GlobalHub*" pp. 1–10, Celcore, Inc., Memphis, Tennessee, 1996.

John Scourias, "*Overview of the Global System for Mobile Communications*", Mar. 27, 1996, pp. 1–16, John Scourias.

Martin A. Iroff & Steve Chen, "A distributed GSM Architecture for Low–Traffic Density Markets ", *Mobile Communications International*, Oct. 1996, pp. 1–3, IBC Business Publishing, London, England.

Information pamphlet, Feb. 1997, pp. 1–7, Version 1.0, Celcore, Inc., Memphis, Tennessee.

"*BS–20/BS–21, D900/D1800 Base Transceiver Station*", pp. 1–2, Geschaftszweig Mobilfunknetze, Munchen, Germany, 1997.

"*Unique Solutions to Complex Challenges of Wireless Carriers*" pp. 1–9, Celcore, Inc., Memphis, Tennessee, 1997.

Michel Mouly and Marie–Bernadette Pautet "*The GSM System for Mobile Communications*", 1992, pp. 79–122, pp. 261–646, Cell & Sys, France.

Lawrence Harte, Stever Prokup, and Richard Levine "*Cellular and PCS, The Big Picture*", 1997, pp. 61–181, McGraw–Hill, United States of America.

George Lamb "*GSM made SIMple*", 1997, pp. 3–158, Regal Printing, United States of America.

*Primary Examiner*—Daniel T. Pihulic

*Attorney, Agent, or Firm*—John G. Flaim

[57] ABSTRACT

A system for providing country-specific data for a telecommunications system is provided. The system includes a data storage system and a user interface. A controller is connected to the data storage system and the user interface, and is configured to retrieve country data from the data storage system in response to a country identifier received from the user interface, and to store the country-specific data in one or more predetermined memory locations.

26 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

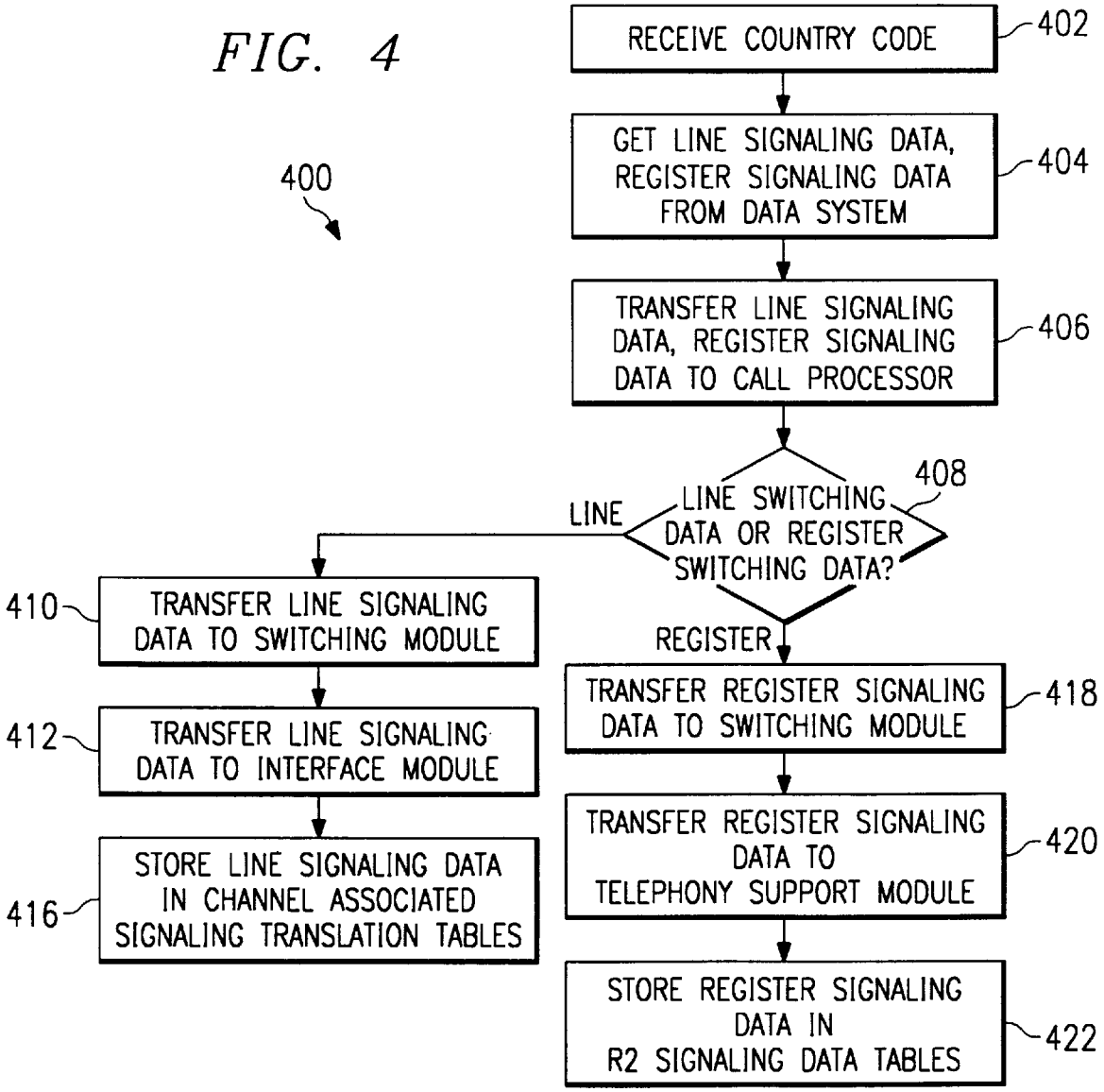
FIG. 4
400
RECEIVE COUNTRY CODE
402
GET LINE SIGNALING DATA, REGISTER SIGNALING DATA FROM DATA SYSTEM
404
TRANSFER LINE SIGNALING DATA, REGISTER SIGNALING DATA TO CALL PROCESSOR
406
LINE SWITCHING DATA OR REGISTER SWITCHING DATA?
408
LINE
REGISTER
TRANSFER LINE SIGNALING DATA TO SWITCHING MODULE
410
TRANSFER LINE SIGNALING DATA TO INTERFACE MODULE
412
STORE LINE SIGNALING DATA IN CHANNEL ASSOCIATED SIGNALING TRANSLATION TABLES
416
TRANSFER REGISTER SIGNALING DATA TO SWITCHING MODULE
418
TRANSFER REGISTER SIGNALING DATA TO TELEPHONY SUPPORT MODULE
420
STORE REGISTER SIGNALING DATA IN R2 SIGNALING DATA TABLES
422

SYSTEM AND METHOD FOR AUTOMATICALLY PROVISIONING A TELECOMMUNICATIONS SWITCH

CLAIM OF PRIORITY

The instant patent application claims priority from the United States provisional patent application designated with Ser. No. 60/060,107, entitled "Cellular Communication System," naming Anthony G. Fletcher and Scott D. Hoffpauir as inventors, and which was filed on Sep. 26, 1997.

RELATED PATENT APPLICATIONS

The instant patent application is directly related to the following patent application: "Integrated Telecommunications Switch," DSC Case No. 834-00, attorney docket no. 24194000.180, naming Scott D. Hoffpauir and Anthony G. Fletcher as inventors, commonly owned and assigned with the present application and which is filed contemporaneously with this application.

FIELD OF THE INVENTION

The present invention relates generally to switching systems for telecommunications, and more particularly to a system and method for automatically provisioning a telecommunications switch that allows country-specific data to be stored at the switch and to be automatically downloaded to components of the switch.

BACKGROUND

Switching systems are used to provide telecommunications services between two or more user interfaces. User interfaces may include telephone handsets, facsimile machines, computers, and other equipment, and may be connected to the switching system by fixed land-based conductors or wireless services. Telecommunications services are provided by establishing a telecommunications channel between two user interfaces, such that encoded analog or digital data may be transmitted between the user interfaces until a state of completion is reached.

When a switching system is set up for operation in a country, it is often necessary to store country-specific protocols and data at predetermined locations of the switching system to allow the switching system to interface with the existing telecommunications systems of the country. Although international standards exist for switching systems, protocols, and interfaces for many countries have variations from those standards that require service personnel to determine and modify the standard software and data on a country-by-country basis.

SUMMARY OF THE INVENTION

Therefore, a need has arisen for a system and method for transferring data to redundant components that reduces or eliminates the need to perform country-specific software code modification of software for a telecommunications system.

In accordance with the present invention, a system and method for controlling a telecommunications system are provided that substantially eliminate or reduce disadvantages and problems associated with previously developed systems and methods for controlling a telecommunications system.

One aspect of the present invention is system for provisioning country-specific data for a telecommunications system. The system includes a data storage system and a user interface. A controller is connected to the data storage system and the user interface, such as a personal computer or other program editor and compiler, and is configured to retrieve country data from the data storage system in response to a country identifier received from the user interface, and to store the country-specific data in one or more predetermined memory locations in switch modules.

Another aspect of the present invention is a method for providing country-specific data for a telecommunications system. The method includes receiving a user-entered country designation at a telecommunications switch. Country-specific data is then retrieved from a data storage system. The country-specific data is stored at predetermined locations of the telecommunications switch modules.

Yet another aspect of the present invention is a method for providing country-specific data for a telecommunications system. The method includes storing register signaling data for two or more countries in a data storage system of a telecommunications switch. Line signaling data for two or more countries is also stored in the data storage system of the telecommunications switch. A user can select different countries and the register signaling and line signaling data tables are then transferred to predetermined locations of the telecommunications switch.

The present invention provides many important technical advantages. One important technical advantage of the present invention is a system for provisioning a telecommunications switch that allows all country-specific data to be stored at the switch and easily provisioned upon selection of a suitable country. The system of the present invention thus eliminates the need to have trained personnel travel to a remote location to set up a telecommunications switch, which results in a significant savings in time and personnel resources. The system of the present invention also eliminates the need to manufacture multiple switches or products that comply with the standards and protocols of different countries, and allows a single switch to be manufactured for use in the different countries.

Another important technical advantage of the present invention is a method for automatically provisioning a telecommunications switch that allows country-specific data for the telecommunications switch to be remotely updated. In this manner, changes to country-specific data that occur from time to time may be automatically updated for all switches from a single remote location, thus eliminating the need to send personnel to remote locations to effect changes in the country-specific data.

Another important technical advantage of the present invention is a system for configuring country-specific protocol data for different trunk groups in a switching system. When a switch system is deployed in a country, it is often necessary to modify PSTN interface protocols and tone tables to allow the switching system to interface with the existing telecommunications systems of that country. The telecommunications switch must also be able to interface with switch systems of other countries, simultaneously using different protocol and tone data for the other countries. The present invention eliminates the need for different switching equipment manufactured for each country, and allows a single switching system to provide the multiple-country functionality.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 4 is a flow chart of a method for provisioning a telecommunications switch in accordance with one embodiment of the present invention;

DETAILED DESCRIPTION OF THE DRAWINGS

Figure 1:
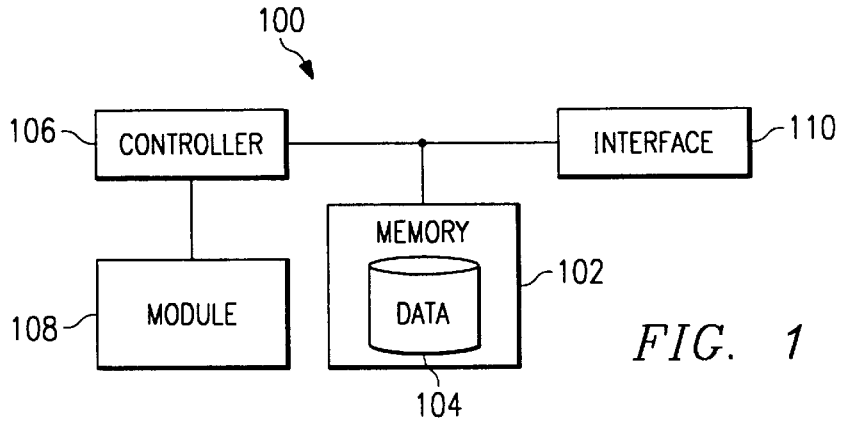
FIG. 1 is a block diagram of a system for automatically provisioning a telecommunications switch in accordance with one embodiment of the present invention.

FIG. 1 is a block diagram of a system 100 for automatically provisioning a telecommunications switch in accordance with one embodiment of the present invention. System 100 may used in conjunction with a telecommunications switch, such as a wireless system switch, a central office system switch, a transmission system switch, or other suitable telecommunications switches.

System 100 includes a data memory 102 that further includes a country data storage system 104. Country data storage system 104 is used to store country-specific switch data for use by components of the telecommunications switch that is utilizing system 100. Country data storage system may include country-specific data, such as signaling data, in a predetermined format such that all country-specific data that may need to be provisioned on the telecommunications switch components is wholly contained within country data storage system 104.

System 100 also includes a controller 106 that is coupled to data memory 102 and country data storage system 104. Controller 106 is configured to retrieve country-specific data from country data storage system 104 and to transfer the data to module 108. Controller 106 is also or alternatively configured to receive programming from interface 110, such that predetermined country data may be altered and replaced with new country data. In this manner, any changes that occur to the country-specific data may be updated at the switch. Controller 106 may be a call processor, a system or component manager, or other suitable controllers.

Module 108 is a switching system component that requires country-specific data for operation. Module 108 may include data registers that must be configured to accept country-specific data fields of predetermined size, data tables that contain country-specific data, or other country-specific data that must be transferred to module 108 before module 108 can function properly in the switching system. Module 108 may also or alternatively be dedicated to a single group of telecommunications channels, used in conjunction with multiple groups of telecommunications channels, or used for purposes not directly associated with individual trunk groups of telecommunications channels.

Interface 110 is coupled to data memory 102 and controller 106. Interface 110 is configured to allow a user to select a country of operation so as to enable controller 106 to retrieve data for the selected country for transfer to module 108. The data may also or alternatively be installed directly on module 108. Interface 110 may also or alternatively be configured to allow a user to modify the country-specific data, and may also or alternatively be configured to receive country-specific data updates from a remote source.

In operation, a user enters a country identifier to cause country-specific data to be retrieved from country data storage system 104 and transferred to module 108. Module 108 uses the country-specific to perform country-specific telecommunications processing functions. A user may also modify the country-specific data stored in country data storage system 104, and data updates may be received through interface 110 to automatically update the data stored in country data storage system 104 without requiring user-entered commands.

Figure 2:
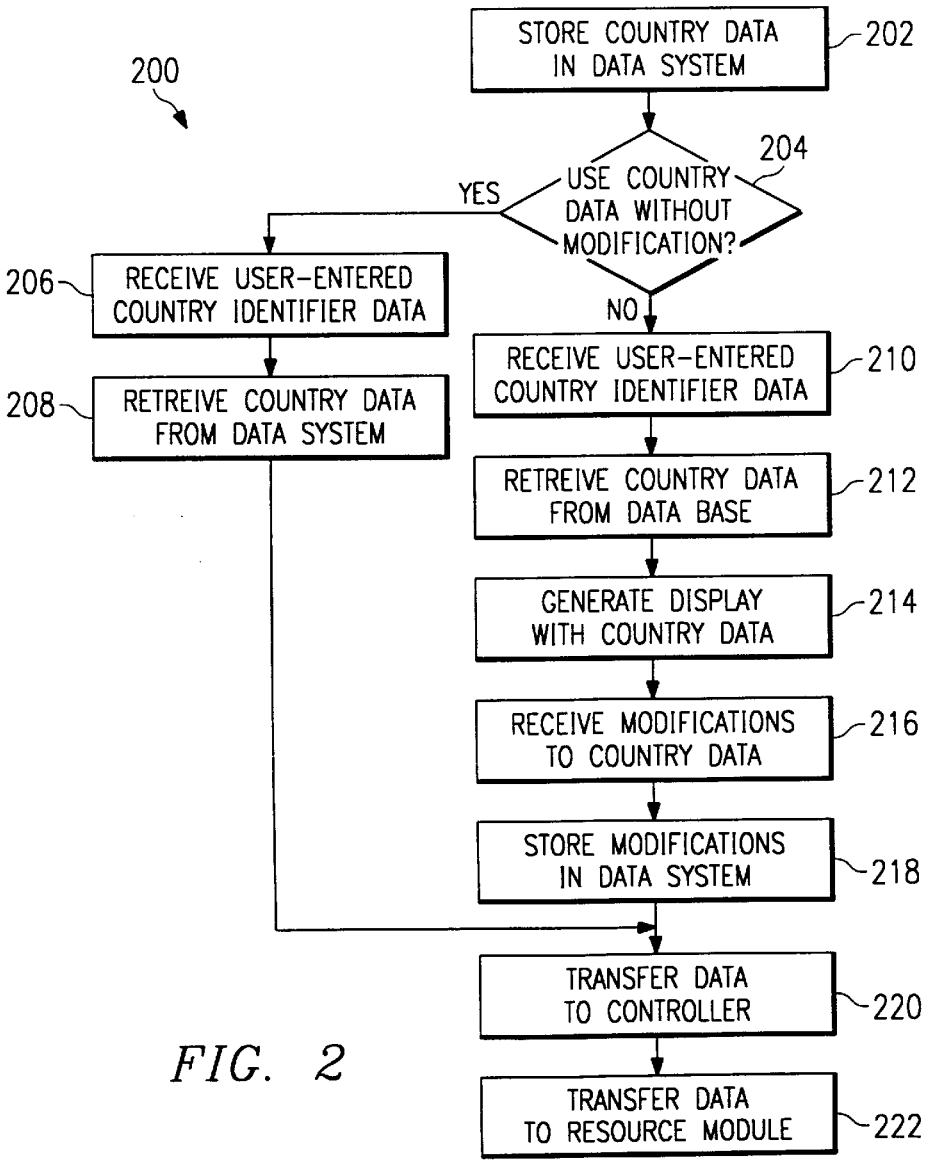
FIG. 2 is a flow chart of a method for automatically provisioning a telecommunications switch in accordance with one embodiment of the present invention.

FIG. 2 is a flow chart of a method 200 for automatically provisioning a telecommunications switch in accordance with one embodiment of the present invention. Method 200 may be used in a wireless communications switch, a remote terminal switch, a central office switch, a transmission switch, or other suitable telecommunications switches. Method 200 may also or alternatively be used to provision a component that is dedicated to a single trunk group of telecommunications channels, used in conjunction with multiple trunk groups of telecommunications channels, or used for purposes not directly associated with individual trunk groups of telecommunications channels.

Method 200 begins at step 202, where country data is stored in a data system. For example, the country data may include one or more country-specific variations of an internationally-adopted standard for signaling, country-specific provisioning data, country-specific tone data, country-specific telecommunications channel format data, or other country-specific data. The method then proceeds to step 204.

At step 204, it is determined whether the country data may be used without modification. For example, if a predetermined period of time has passed since the country data was stored in the data system, then an automatic update process may be used to update the country data to the most recent country data. Also or alternatively, a user may wish to modify some of the country data. If the country data may be used without modification, the method proceeds to step 206.

At step 206, user-entered country identifier data is received. The country identifier data may also be automatically updated after receiving country identifier data over a public network or from another suitable source. The method then proceeds to step 208, where country data corresponding to the country identifier data is retrieved from the data system. The method then proceeds to step 220.

If it is determined that the country data should be modified at step 204, the method proceeds to step 210 where user-entered country identifier data is received. The country identifier data may also be automatically generated after receiving country identifier data over a public network or from another suitable source. The method then proceeds to step 212, where country data corresponding to the country identifier data is retrieved from the data system.

At step 214, one or more displays are generated that present the country data in a user-readable format. If the country data updates are performed remotely, then this step may be omitted. The method then proceeds to step 216, where modifications to the country data are received. The modifications are stored in the data system at suitable locations at step 218. The method then proceeds to step 220.

At step 220, the country data is transferred to a controller, such as controller 106. The controller then transfers the data to a resource module at step 222. The controller may transfer the data with control data that causes the resource module to store the data in a suitable data memory location, the resource module may be configured to process the data as suitable, or other suitable methods may be used to incorporate the data within the resource module.

Figure 3:
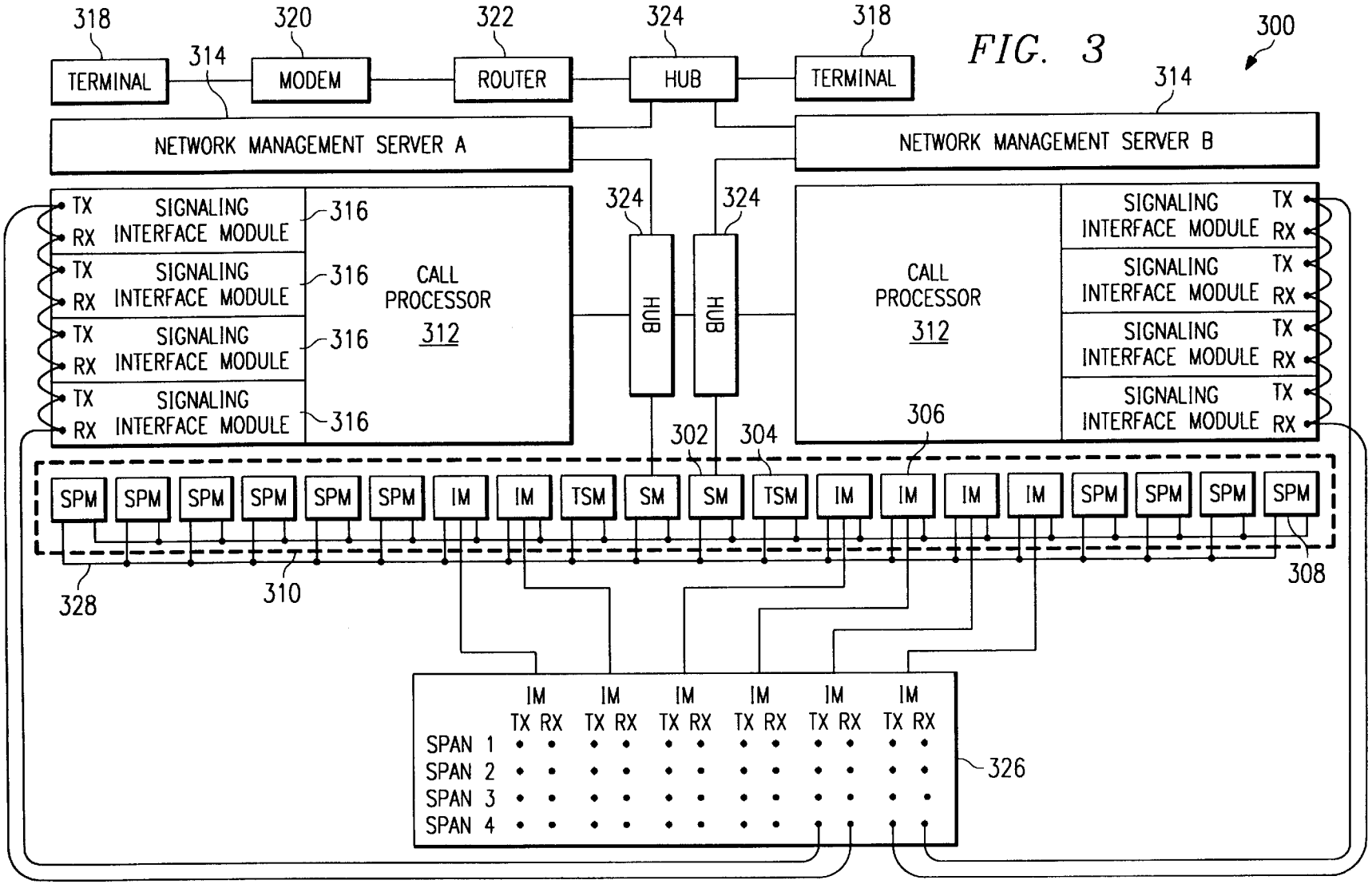
FIG. 3 is a block diagram of a telecommunications switch in accordance with one embodiment of the present invention.

FIG. 3 is a block diagram of a telecommunications switch 300 in accordance with one embodiment of the present invention. Telecommunications switch 300 is configured for use as a wireless communications switch, but the present invention may also be implemented in other telecommunications switches, including but not limited to central office switches, transmission switches, remote terminal switches, and other suitable switches.

The telecommunications switch 300 preferably includes one or more switching modules 302. The switching module 302 may be implemented in software, hardware, or a suitable combination of software and hardware. For example, the switching module 302 may comprise suitable digital data processing devices, such as a switching matrix, a processor (for example a Motorola 68360 telecommunications processor), random access memory, and other devices. The switching module 302 runs a suitable real time operating system such as pSOS+™.

The switching module 302 may also include one or more pulse code modulation bus interfaces, one or more control bus interfaces such as High Level Data Link Controller (HDLC) control bus interfaces, one or more Ethernet interfaces, and an arbitration bus interface to other switching modules 302. The switching module 302 is coupled to a suitable data link 328, such as one or more control buses such as High Level Data Link Control buses and one or more pulse code modulation buses.

The switching module 302 performs switching operations, clock operations, and local communications between the resource module assembly 310 components (the switching modules 302, the telephony support modules 304, the interface modules 306, and the signal processing modules 308). These functions may be performed using pulse code modulation switching and data transfer techniques, Link Access Protocol on the D Channel communications, Ethernet interface communications, and other suitable data transfer techniques.

The telecommunications switch 300 also preferably includes one or more telephony support modules 304. The telephony support module 304 may be implemented in software, hardware, or a suitable combination of software and hardware. For example, the telephony support module 304 may comprise suitable telecommunications data processing equipment, such as a processor (for example, an Intel 80186 processor), random access memory, one or more redundant High Level Data Link Controller bus interfaces, one or more pulse code modulation buses, and an arbitration bus for establishing active telephony support module 304 status. The telephony support module 304 is coupled to a suitable data link 328, such as one or more High Level Data Link Control buses and one or more pulse code modulation buses.

The telephony support module 304 may be used to provide tone generation, R2 protocol transceiver functions, and digitized announcement processing or generation for the telecommunications switch 300. The telephony support module 304 may also provide call setup functions, such as digit collection and out-pulsing, and call completion functions, such as digitized announcement generation and call supervisory tone generation. A single telephony support module 304 provides the required functionality for the telecommunications switch 300. One or more additional telephony support modules 304 are used to provide redundancy in the event of component failure.

The telecommunications switch 300 also preferably includes one or more interface modules 306. The interface module 306 is an interface device that is used to interface a suitable number of telecommunications lines that carry data in a predetermined format, such as an E1 data format, with the telecommunications switch 300. The interface module 306 may be implemented in software, hardware, or a suitable combination of software and hardware. For example, the interface module 306 may comprise suitable data processing equipment, such as a processor (for example an Intel 80186 processor), random access memory, up to four E1 ports, redundant High Level Data Link Controller bus interfaces, and pulse code modulation bus interfaces.

The interface modules 306 provide the physical interface between the telecommunications switch 300 and other switches, the switched network, and the wireless communications base stations. The interface modules 306 also support in-band trunk signaling for data channels that are configured for channel associated signaling, and transmit data to and receive data from the signaling interface modules 316.

The interface module 306 is coupled to a suitable data link 328, such as one or more High Level Data Link Control buses and one or more pulse code modulation buses. The interface module 306 is also coupled to an interface module panel 326, which is used to connect the interface module 306 to external data links such as one or more transmission links. Each external data link typically includes a transmit lead and a receive lead.

The telecommunications switch 300 also preferably includes one or more signal processing modules 308. The signal processing module 308 may be implemented in software, hardware, or a suitable combination of software and hardware. For example, the signal processing module 308 may comprise suitable data processing equipment, such as a processor (for example an Intel 80186 processor), random access memory, one or more Super Harvard Architecture Computer (SHARC) digital signal processor circuits on each a predetermined number of daughter board modules, redundant High Level Data Link Controller buses, pulse code modulation matrix bus interfaces, and other signal processing application hardware.

The signal processing module 308 may be used to perform transcoding and rate adaption (TRAU) functions, such as converting from a wireless system speech encoding format to a pulse code modulation data format. For example, the telecommunications switch 300 may be used to provide switching services in a wireless telecommunications system that uses Groupe Speciale Mobile format data for a Global System for Mobile Telecommunications (GSM) switch, which processes telecommunications data using regular pulse excitation (RPE) and long term prediction (LTP) formats. Signal processing module 308 converts data from the GSM data format to an appropriate format, such as the pulse code modulation data format. Digital signal processor daughterboards may be used to allow the capacity of calls handled by the signal processing module 308 to be increased or decreased, as appropriate to support system requirements.

The telephony support modules 304, the interface modules 306, and the signal processing modules 308 are preferably coupled through switching modules 302 and hub switches 324 to redundant call processor systems 312. The call processor system 312 is operable to control the function of components of the telecommunications switch 300.

The call processor system 312 is a general purpose computing platform, such as a Pentium II based computing platform, that includes suitable hardware and software systems to support telecommunications processing. The call processor system 312 may use a real-time operating system such as QNX™ to support the real-time call processing requirements of telecommunications switch 300.

The call processor system 312 preferably includes one or more systems that allow it to perform the functions of a base station controller system and a message switching center system. In addition, the call processor system 312 may include other hardware and software elements that take part in processing calls directed to, or initiated by, the subscriber units. Specifically, the call processor system 312 includes a call processing application that provides various call processing and signaling functions, such as call origination and termination functions, as well as location updating and handover of mobile subscribers.

For example, the call processing application may provide GSM call processing functions and include a visitor location register system, a home location register system, a mobile application part system, a base station subscriber system, a mobile switching center system, an SS7 signaling system, and other suitable systems. An example of a GSM call processing application that may be used to provide the functionality of call processor system is provided by the patent application entitled "Integrated Telecommunications Switch," DSC Case 834-00, attorney docket no. 24194000.180, naming Scott D. Hoffpauir and Anthony C. Fletcher as inventors, commonly owned and assigned with the present application, filed contemporaneously with this application, and which is hereby incorporated by reference for all purposes.

The call processor system 312 is coupled to a primary network management server 314 and a secondary network management server 314. The primary and secondary network management servers 314 are redundant network management systems servers that provide operation, administration, maintenance, and other functions for the components of the telecommunications switch 300. The network management servers 314 incorporate the functionality of both an Operations Maintenance Center—Radio (OMC-R) and an Operations Maintenance Center—Switching (OMC-S).

The primary and secondary network management servers 314 are data systems that may be used to store country data for use by the components of telecommunications switch 300. For example, the telephony support modules 304 and the interface modules 306 may require country-specific line and register signaling data to process R2 signaling or other suitable signaling. The call processor 312 is operable to retrieve the country data from the network management server 314 and to transfer it to suitable memory locations of the telephony support module 304 and the interface module 306. The country data may also be modified by a user through terminal 318, or may be automatically updated using data received from modem 320 or the switched network through interface modules 306. The country data may also or alternatively be stored in a data system of call processor 312 or data systems of other suitable components of telecommunications switch 300.

The signaling interface modules 316 are coupled to the call processor systems 312 and the interface modules 306. The signaling interface modules 316 are used to provide an signaling system 7 (SS7) data format. For example, data in an SS7 data format may be received from a transmission link from the switched network or other switches 300, and may be switched to another transmission link, such as an E1 telecommunications channel, from interface modules 306 to signaling interface modules 316 by switching modules 302. The signaling interface modules 316 may also be incorporated into telecommunications switch 300 as resource modules 310.

The terminals 318 are coupled to the primary and secondary network management servers 314 either directly or through a modem 320, a router 322, and hub switch 324. The terminals 318 are used to interface with the primary and secondary network management servers 314. The terminals 318 and the primary and secondary network management servers 314 include a network management system that allows a user to remotely monitor and manage telecommunications switch 300.

In operation, a user of a wireless telecommunications system attempts to place a call using a telecommunications switch 300. Signaling data and other call control data is received from a wireless base station in an E1 data format at an interface module 306. This data is then switched through a switching module 302 to a telephony support module 304, which performs call setup functions. A call processor system 312 receives the signaling data, and determines the call destination.

Depending upon the call destination, the call processor system 312 sends signaling and call control data to the switched network, another telecommunications switch 300, or a wireless base station serviced by the telecommunications switch 300 containing the call processor system 312. If a telecommunications channel can not be established, a busy signal, no answer message, or other appropriate response is generated by a telephony support module 304, and the call attempt is terminated.

The signaling and control data is processed in a predetermined format, such as the R2 standard format, or in a country-specific format. Country-specific variations of standard formats, such as the R2 format, may also be used. Predetermined format data is stored in a memory device of telecommunications switch 300, such as in call processor 312, network management servers 314, or other suitable locations, such that the format data for the country in which telecommunications switch 300 is operated may be installed in the components of telecommunications switch 300, such as the telephony support module 304 and the interface module 306, by selection of the country of operation. A menu of countries is presented to an operator over terminal 318. The operator's input is transferred to network management server 314, which further transfers the selection to call processor 312.

Call processor 312 is operable to receive the country selection from a user, and to transfer the country-specific format data from the data storage device of the telecommunications switch 300 to switching module 302, telephony support module 304, interface module 306, signal processing module 308, and other components of telecommunications switch 300. In this manner, telecommunications switch 300 may be easily transferred to a country of operation and provisioned for operation, and does not require country-specific data for individual components of telecommunications switch 300 to be programmed by an operator.

FIG. 4 is a flow chart of a method 400 for automatically provisioning a telecommunications switch in accordance with one embodiment of the present invention. Method 400 may be performed at the manufacturing location, in the field after installation, or at other suitable locations. Method 400 begins at step 402 where country code data is received. The country code data is used to identify a country of operation for the telecommunications switch, and may include user-entered data, transmitted data, broadcast data, or other suitable data.

At step 404, line signaling data and/or register signaling data is retrieved from a data system, such as network management server 314. In addition, the code that is received from the data system may need to be translated for use in components of the switching system, or inserted into pre-existing code such that the code must subsequently be compiled. The line signaling data and/or register signaling data is transferred to the call processor system at step 406, such as to a resource manager system of the call processor system that is used to interface with the resource modules. For example, the call processor may receive a message from the interface module or the telephony support module that line signaling or register signaling data is missing.

At step 408, it is determined whether the data is line signaling data or register signaling data. If the data is line signaling data, the method proceeds to step 410 where the line signaling data is transferred to a switching module from the call processor. At step 412, the line signaling data is then transferred to the interface module or modules. The method then proceeds to step 416, where the line signaling data is stored in channel associated signaling translation tables of the interface module or modules.

If it is determined at step 408 that the data is register signaling data, then the method proceeds to step 418 where the register signaling data is transferred to the switching module from the call processor. The register signaling data is then transferred from the switching module to the telephony support module or modules at step 420, and is stored in R2 signaling data tables of the telephony support module or modules at step 422.

Figure 5:
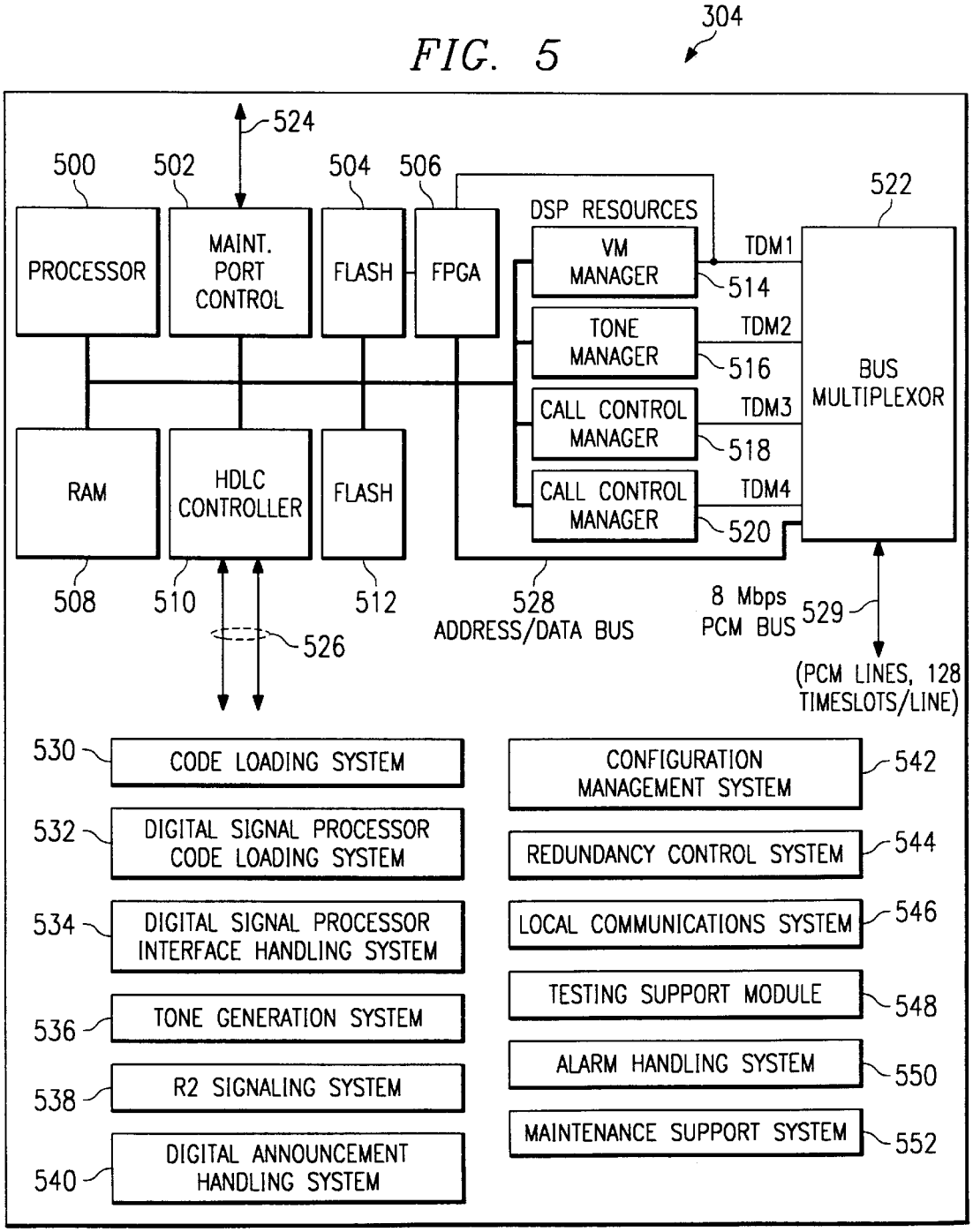
FIG. 5 is a block diagram of a telephony support module in accordance with one embodiment of the present invention.

FIG. 5 is a block diagram of a telephony support module 304 in accordance with one embodiment of the present invention. Telephony support module 304 is used to provide tone generation, R2 transceiver functionality, and digitized announcement functionality for a telecommunications system. Telephony support module 304 supports standard tone sets.

Telephony support module 304 includes a processor 500. Processor 500 may be a suitable processor including but not limited to a Intel 80186 processor. Processor 500 controls the activities and functions of telephony support module 304. Processor 500 is coupled to the other components of telephony support module 304 via an address/data bus 528. Telephony support module 304 also includes a maintenance port control module 502. Maintenance port control module 502 provides an RS-232 communications interface for diagnostic and troubleshooting purposes. Maintenance port control module 502 is coupled to maintenance port interface 524.

Telephony support module 304 also includes flash memory module 504. Flash memory module 504 is used to store digitized announcements, operational code, country-specific data, and other suitable data. Flash memory module 504 is operable to receive control commands to initiate playback of the digitized announcements. Field programmable gate array ("FPGA") module 506 of telephony support module 304 controls flash memory module 504 playback. For example, field programmable gate array module 506 may receive control commands for playback of a digitized announcement. Field programmable gate array module 506 then generates additional control commands that cause flash memory module 504 to play back the digitized announcement.

Random access memory module 508 of telephony support module 304 provides memory storage space for code execution and data storage. Random access memory module 508 is used by the components of telephony support module 304. Telephony support module 304 also includes High Level Data Link Controller module 510. High Level Data Link Controller module 510 is a two-port serial communications controller that provides communications over two redundant High Level Data Link Controller buses 526. High Level Data Link Controller module 510 supports point-to-point local communications between the telephony support module 304 and the switching module 302.

Flash memory module 512 of telephony support module 304 stores a non-volatile copy of boot code, operational code, country-specific protocol data tables, field programmable gate array data, digital signal processor code, programmable R2 data, and tone tables. The boot block of flash memory module 512 is hardware protected from inadvertent erasure. Voice message manager module 514 is a digital signal processor resource which is implemented in or more suitable digital signal processors. Voice message manager module 514 manages the recording and playback of digital announcements. Voice message manager module 514 provides control for both 8-second and 16-second messages.

Tone manager module 516 is a digital signal processor resource. Tone manager module 516 manages the generation and decoding of tones, including but not limited to dual tone multiple frequency (DTMF) tones, using a table downloaded from processor 500. This table contains such data as the time slot data, tone generation class, frequencies, levels, and other suitable data for each of the tones to be generated.

Call control manager modules 518 and 520 are digital signal processor resources. The call control manager modules manage the trunk signaling for the purposes of transmitting and receiving the call routing data, such as dialed digits, the status of the called party, the identification of the calling party, the category of the calling party, and other suitable data. Signaling state engines are executed on the telephony support module 304 for the purpose of transmitting or receiving data over a public switch telecommunications network interface that is configured for channel-associated signaling. Multiplexer module 522 switches the time division multiplex buses 529, operating at 8 megabits per second, from the pulse code modulation bus to the 2 megabit per second time division multiplex buses used by the digital signal processor resources and flash memory module 504.

Telephony support module 304 also includes software systems that operate on the hardware components of telephony support module 304 described above, which perform operations required for the operation of the telephony support module 304. These software systems include a code loading system 530, a digital signal processor code loading system 532, a digital signal processor interface handling system 534, a tone generation system 536, an R2 signaling system 538, a digital announcement handling system 540, a configuration management system 542, a redundancy control system 544, a local communications system 546, a testing support module 548, an alarm handling system 550, and a maintenance support system 552. Each of these systems is described in greater detail below.

The code loading system 530 of telephony support module 304 performs downloads via the switching module 302 of all software components, such as boot code, from a memory device of the call processor system 49. The digital signal processor code loading system 532 loads digital signal processor code onto the digital signal processors and initializes the digital signal processors. When all the code has been written to the digital signal processors, the digital signal processors will execute the code from internal memory.

The digital signal processor interface handling system 534 interfaces the processor 500 to the digital signal processors to initially configure all digital signal processor channels. The tone generation system 536 initializes the tone generation table so that the digital signal processor can generate the required tones. The tone data may include country-specific data that must be retrieved from a data storage system and installed in tone generation system 536. The tone data may be installed upon system startup, may be installed in response to a message generated by telephony support module 304 that indicates the absence of the tone data, or may be installed by other suitable methods.

The R2 signaling system 538 performs the R2 signaling function for the purpose of receiving and transmitting call routing, call status, and call identification data over a public switched telecommunications network interface. The R2 signaling system 538 may require country-specific register signaling data that must be retrieved from a data storage system and installed in R2 signaling system 538. The country-specific register signaling data may be installed upon system startup, may be installed in response to a message generated by telephony support module 304 that indicates the absence of the register signaling data, or may be installed by other suitable methods.

The digital announcement handling system 540 manages the recording and playback of digital announcements. The configuration management system 542 manages the configuration of the individual digital processor channels. The redundancy control system 544 detects changes in the telephony support module 304 bus ownership status, such as from online to standby, and transmits a message to the switching module 302 when a change in status occurs. The redundancy control system 544 of telephony support module 304 also provides support for recovering from fail-over from an online telephony support module 304 to a standby telephony support module 304 without dropping established calls.

The local communication system 546 manages communications with the switching module 302 over High Level Data Link Controller buses 526. The testing support module 548 generates a response to test commands and is also configured to make various connections required for built in tests and fault isolation tests. The alarm handling system 550 monitors the telephony support module 304 for alarm and error conditions and transmits an alarm or error message to the switching module 302 when an alarm or error condition is present. The maintenance support system 552 manages the diagnostic input and output to and from the telephony support module 304 via an RS232 port.

In operation, one or more software systems of telephony support module 304, such as the tone generation system 536 or the R2 signaling system 738, obtain country-specific data from a data storage system. The country-specific data may be transmitted in response to a request generated by the software systems of telephony support module 304, may be transmitted automatically at system startup, or may be transmitted by other suitable procedures. The country-specific data is stored in suitable memory locations of telephony support module 304 so as to be utilized by the systems and components of telephony support module 304 so as to allow telephony support module 304 to operate in one or more countries.

Figure 6:
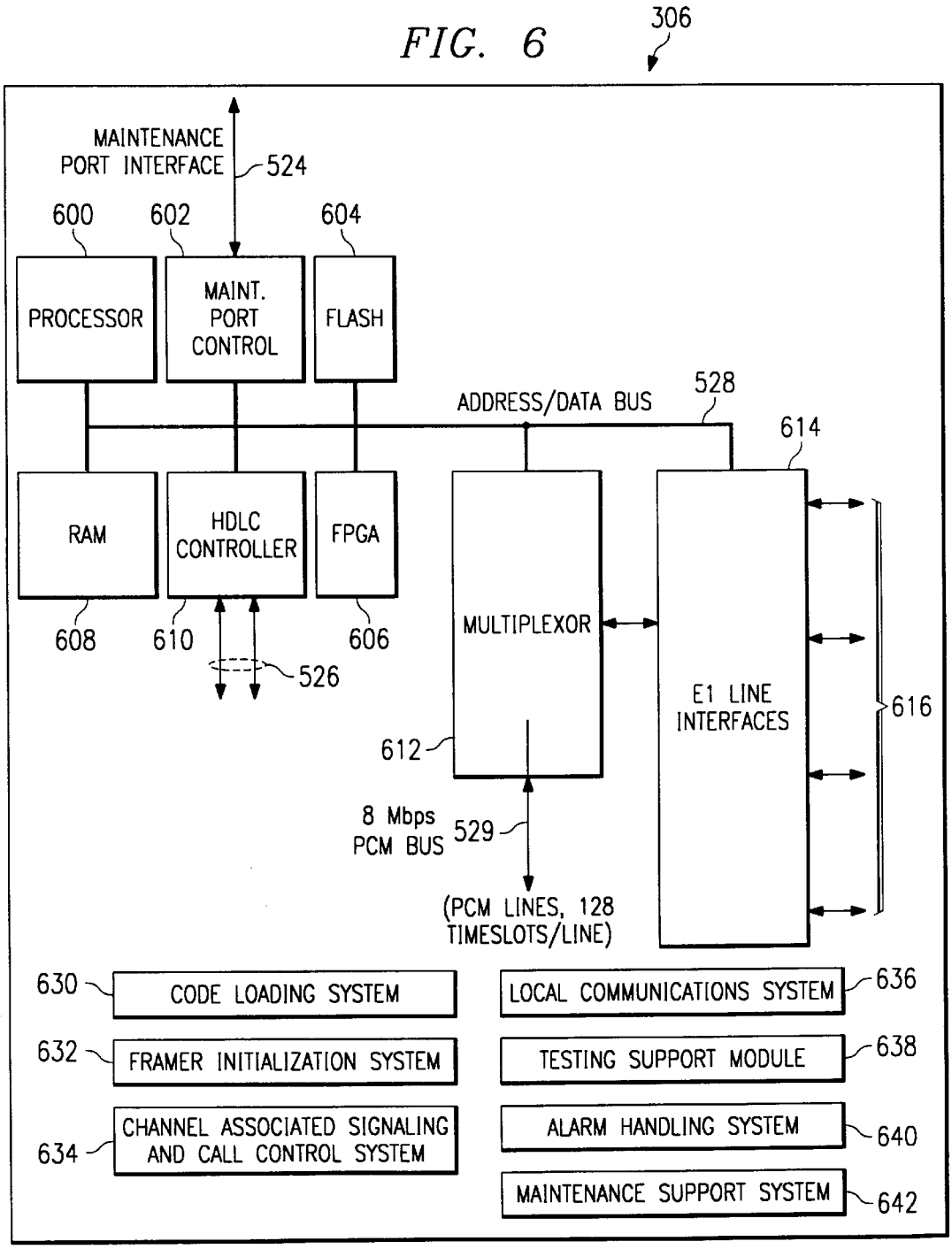
FIG. 6 is a block diagram of an interface module in accordance with one embodiment of the present invention.

FIG. 6 is a block diagram of an interface module 306 in accordance with one embodiment of the present invention. Interface module 306 is used to provide the physical interface between the telecommunications switch 300 and the wireless base stations, the switched network, and other suitable telecommunications system components. The interface module 306 is also used to support in-band signaling for telecommunications channels that are configured for channel associated signaling.

Interface module 306 includes a processor 600. Processor 600 may be a suitable processor including but not limited to a Intel 80186 processor. Processor 600 controls the activities and functions of interface module 306. Processor 600 is coupled to the other components of interface module 306 via address/data bus 528. Interface module 306 also includes a maintenance port control module 602. Maintenance port control module 602 provides an RS232 communications interface for diagnostic and troubleshooting purposes. Maintenance port control module 602 is coupled to maintenance port interface 524.

Interface module 306 also includes flash memory module 604. Flash memory module 604 is used to store a nonvolatile copy of boot code, operational code, and field programmable gate array data. Field programmable gate array ("FPGA") module 606 of interface module 306 provides logic to interconnect the interface module 306 components, including connections between E1 line interfaces 614 and processor 600. The field programmable gate array also provides a clock detection function to determine the status of the system time division multiplex bus clock that is used to clock the line interfaces 614. The clock detection function of the field programmable gate array 606 prevents the line interfaces 614 from going into a high impedance state during operation if clock failure occurs.

Random access memory module 608 of interface module 306 provides memory storage space for code execution and data storage. Random access memory module 608 is used by the components of interface module 306. Interface module 306 also includes High Level Data Link Controller module 610. High Level Data Link Controller module 610 is a two-port serial communications controller that provides communications over two redundant High Level Data Link Controller buses 526. High Level Data Link Controller module 610 supports point-to-point local communications between the interface module 306 and the switching module 302.

Multiplexer module 612 switches the time division multiplex buses 529, operating at 8 megabits per second, from the pulse code modulation bus to the four 2 megabit per second time division multiplex buses that are routed to line interfaces 614. Line interfaces 614 provide complete transceiver and framer functionality for a suitable number of external telecommunications lines, such as four telecommunications lines 616 carrying data in an E1 standard format. For each telecommunications line 616, a framer element of line interfaces 614 locates the frame and multiframe boundaries and monitors the data for alarm conditions. Line interfaces 614 are also configured to insert and extract signaling data.

Interface module 306 also includes software systems that operate on the hardware components of interface module 306 described above, which perform operations required for the operation of the interface module 306. These software systems include a code loading system 630, a framer initialization system 632, a channel associated signaling and call control system 634, a local communications system 636, a testing support module 638, an alarm handling system 640, and a maintenance support system 642. Each of these systems is described in greater detail below.

The code loading system 630 of interface module 306 performs downloads via the switching module 302 of all software components, such as boot code, from a memory device of the call processor system 312. The framer initialization system 632 performs all required initialization for all of the line interface modules 614. The channel associated signaling and call control system 634 maintains the signaling status of individual telecommunications channels that are configured for channel associated signaling. The channel associated signaling and call control system 634 drives the signaling state of individual telecommunications channels, such as DSO format channels, in response to control data received from the switching module 302. The signaling bits received at line interface 614 are translated using tables of line signaling data to decode the signaling data received over the telecommunications channel. Outgoing signaling data is also translated by the channel associated signaling and call control system 634. The channel associated signaling and call control system 634 is operable to receive country data, such as R2 line signaling data, from a data system.

The local communication system 636 manages communications with the switching module 302 over High Level Data Link Controller buses 526. The testing support module 638 generates a response to test commands and is also configured to make various connections required for built in tests and fault isolation tests. The alarm handling system 640 monitors the interface module 306 and the telecommunications lines 616 for alarm and error conditions and transmits an alarm or error message to the switching module 302 when an alarm or error condition is present. The maintenance support system 642 manages the diagnostic input and output to and from the interface module 306 via an RS232 port.

In operation, one or more software systems of interface module 306, such as the tone generation system 536 or the R2 signaling system 738, obtain country-specific data from a data storage system. The country-specific data may be transmitted in response to a request generated by the software systems of interface module 306, may be transmitted automatically at system startup, or may be transmitted by other suitable procedures. The country-specific data is stored in suitable memory locations of interface module 306 so as to be utilized by the systems and components of interface module 306 so as to allow interface module 306 to operate in one or more countries.

Although several embodiments of the present invention and its advantages have been described in detail, it should be understood that changes, substitutions, transformations, modifications, variations, and alterations may be made therein without departing from the teachings of the present invention, the spirit and the scope of the invention being set forth by the appended claims.

What is claimed is:

1. A system for automatically provisioning country-specific data for a telecommunications system comprising:

a telecommunications switch operable to receive and process data;

a data storage system that further comprises country-specific data coupled to the switch;

a user interface to the telecommunications switch; and wherein the telecommunications switch is operable to receive a user-entered country designation, to retrieve selected country-specific data from the data storage system, and to store the country-specific data in one or more predetermined memory locations.

2. The system of claim 1 wherein the telecommunications switch comprises:

a call processor system;

a resource module coupled to the call processor system; and wherein the country-specific data is stored in one or more predetermined memory locations of the resource module.

3. The system of claim 1 wherein the telecommunications switch comprises:

a call processor system;

an interface module coupled to the call processor system; and wherein the country-specific data is stored in one or more predetermined memory locations of the interface module.

4. The system of claim 1 wherein the telecommunications switch comprises:

a call processor system;

a telephony support module coupled to the call processor system; and wherein the country-specific data is stored in one or more predetermined memory locations of the telephony support module.

5. The system of claim 1 wherein the telecommunications switch comprises:

a call processor system;

a switching module coupled to the call processor system;

two or more resource modules coupled to the switching module, where the country-specific data is stored in predetermined memory locations of the resource modules; and wherein the switching module is operable to transfer data from the call processor system to predetermined resource modules.

6. The system of claim 1 wherein the data storage system further comprises an R2 signaling data system containing country-specific variations of the R2 signaling data standards.

7. The system of claim 1 wherein the user interface to the telecommunications switch comprises:

a network management server coupled to the telecommunications switch;

a user interface coupled to the network management server; and wherein the user interface is operable to generate user input interfaces and to receive user-entered data in response to the user input interfaces.

8. The system of claim 1 further comprising an update system, wherein the update system is operable to receive update data from a telecommunications channel and to store the update data in the country-specific data system.

9. A method for providing country-specific data for a telecommunications system comprising:

receiving a user-entered country designation at a telecommunications switch;

retrieving country-specific data from a data storage system; and storing the country-specific data at predetermined locations of the telecommunications switch.

10. The method of claim 9 wherein receiving a user-entered country designation at a telecommunications switch comprises:

receiving the user-entered country designation at a user interface of a network management server of the telecommunications switch; and transmitting the user-entered country designation to a call processor system of the telecommunications switch.

11. The method of claim 9 wherein retrieving country-specific data from a data storage system comprises retrieving country-specific R2 data from the data storage system.

12. The method of claim 9 wherein storing the country-specific data at predetermined locations of the telecommunications switch comprises:

transmitting the country-specific data to a resource module of the telecommunications switch from a call processor system of the telecommunications switch; and storing the country-specific data at predetermined locations of the resource module.

13. The method of claim 9 wherein storing the country-specific data at predetermined locations of the telecommunications switch comprises:

transmitting the country-specific data to an interface module of the telecommunications switch from a call processor of the telecommunications switch; and storing the country-specific data at predetermined locations of the interface module.

14. The method of claim 9 wherein storing the country-specific data at predetermined locations of the telecommunications switch comprises:

transmitting the country-specific data to a telephony support module of the telecommunications switch from a call processor of the telecommunications switch; and storing the country-specific data at predetermined locations of the telephony support module.

15. The method of claim 9 wherein storing the country-specific data at predetermined locations of the telecommunications switch comprises:

transmitting the country-specific data to a switching module of the telecommunications switch from a call processor of the telecommunications switch;

transmitting the country-specific data from the switching module to a resource module of the telecommunications switch; and storing the country-specific data at predetermined locations of the resource module.

16. The method of claim 9 wherein storing the country-specific data at predetermined locations of the telecommunications switch comprises:

transmitting the country-specific data to a switching module of the telecommunications switch from a call processor of the telecommunications switch;

transmitting the country-specific data from the switching module to an interface module of the telecommunications switch; and storing the country-specific data at predetermined locations of the interface module.

17. The method of claim 9 wherein storing the country-specific data at predetermined locations of the telecommunications switch comprises:

transmitting the country-specific data to a switching module of the telecommunications switch from a call processor of the telecommunications switch;

transmitting the country-specific data from the switching module to a telephony support module of the telecommunications switch; and storing the country-specific data at predetermined locations of the telephony support module.

18. A method for providing country-specific data for a telecommunications system comprising:

storing register signaling data for two or more countries in a data storage system of a telecommunications switch;

storing line signaling data for two or more countries in the data storage system of the telecommunications switch;

receiving a user-entered country designation at the telecommunications switch;

transferring the register signaling data to predetermined locations of the telecommunications switch; and transferring the line signaling data to predetermined locations of the telecommunications switch.

19. The method of claim 18 wherein storing register signaling data for two or more countries in the data storage system of a telecommunications switch comprises storing common R2 register signaling data and country-specific R2 register signaling variation data in the data storage system.

20. The method of claim 18 wherein storing line signaling data for two or more countries in the data storage system of a telecommunications switch comprises storing common R2 line signaling data and country-specific R2 line signaling variation data in the data storage system.

21. The method of claim 18 wherein receiving a user-entered country designation at the telecommunications switch comprises:

generating a country selection display at a user interface system;

receiving a user-entered country designation at the user interface system; and transmitting the user-entered country designation to a call processing system.

22. The method of claim 18 wherein receiving a user-entered country designation at the telecommunications switch comprises:

receiving a user-entered country designation at a data channel interface from a data channel; and transmitting the user-entered country designation to a call processing system from the data channel interface.

23. The method of claim 18 wherein transferring the register signaling data to predetermined locations of the telecommunications switch comprises:

transmitting the register signaling data from the call processor to a telephony support module; and storing the register signaling data at predetermined locations of the telephony support module.

24. The method of claim 18 wherein transferring the register signaling data to predetermined locations of the telecommunications switch comprises:

transmitting the register signaling data from the call processor system to a switching module of the telecommunications switch;

transmitting the register signaling data from the switching module to a telephony support module; and storing the register signaling data at predetermined locations of the telephony support module.

25. The method of claim 18 wherein transferring the line signaling data to predetermined locations of the telecommunications switch comprises:

transmitting the line signaling data from the call processor to an interface module; and storing the line signaling data at predetermined locations of the interface module.

26. The method of claim 18 wherein transferring the line signaling data to predetermined locations of the telecommunications switch comprises:

transmitting the line signaling data from the call processor system to a switching module of the telecommunications switch;

transmitting the line signaling data from the switching module to an interface module; and storing the line signaling data at predetermined locations of the interface module.

* * * * *